United States Patent [19]

Paek et al.

[11] Patent Number: 5,212,740
[45] Date of Patent: May 18, 1993

[54] EDGE DETECTION METHOD AND APPARATUS FOR AN IMAGE PROCESSING SYSTEM

[75] Inventors: Jun-gi Paek, Seoul; Yong-cheol Park, Wansan; Chan-kyu Myeong, Nam, all of Rep. of Korea

[73] Assignee: Samsung Electronics Co., Ltd., Kyunggi, Rep. of Korea

[21] Appl. No.: 679,205

[22] Filed: Apr. 2, 1991

[30] Foreign Application Priority Data

Mar. 28, 1991 [KR] Rep. of Korea ............ 91-4871

[51] Int. Cl.[5] .................................. G06K 9/48
[52] U.S. Cl. ............................. 382/22; 382/27; 382/34
[58] Field of Search ............ 382/22, 27, 34, 41, 382/21, 30, 50

[56] References Cited

U.S. PATENT DOCUMENTS

| 4,710,965 | 12/1987 | Kobayashi | 382/27 |
| 4,791,677 | 12/1988 | Mori et al. | 382/27 |
| 4,831,658 | 6/1989 | Umeda et al. | 382/27 |
| 4,962,542 | 10/1990 | Klees | 382/27 |
| 5,033,099 | 7/1991 | Yamada et al. | 382/21 |
| 5,048,099 | 9/1991 | Lee | 382/22 |
| 5,050,222 | 9/1991 | Lee | 382/22 |

Primary Examiner—Joseph Mancuso
Attorney, Agent, or Firm—Rothwell, Figg, Ernst & Kurz

[57] ABSTRACT

An edge detection apparatus and method for an image processing system are disclosed. The apparatus comprises a conversion means for converting input pixel data into tri-state valves, a matching means for obtaining inner products of tri-state valves and prespecified edge patterns and a decision means for determining the pixel data to be an edge when the pixel data is equal to the tri-state values. The edge detection apparatus can remove noise without an additional low pass filters, simplify the hardware and do real time process.

11 Claims, 11 Drawing Sheets

FIG. 5A $w1 = \begin{array}{|c|c|c|} \hline -1 & 0 & 1 \\ \hline -1 & 0 & 1 \\ \hline -1 & 0 & 1 \\ \hline \end{array}$

FIG. 5B $w2 = \begin{array}{|c|c|c|} \hline -1 & -1 & -1 \\ \hline 0 & 0 & 0 \\ \hline 1 & 1 & 1 \\ \hline \end{array}$

FIG. 5C $w3 = \begin{array}{|c|c|c|} \hline -1 & -1 & 0 \\ \hline -1 & 0 & 1 \\ \hline 0 & 1 & 1 \\ \hline \end{array}$

FIG. 5D $w4 = \begin{array}{|c|c|c|} \hline 0 & -1 & -1 \\ \hline 1 & 0 & -1 \\ \hline 1 & 1 & 0 \\ \hline \end{array}$

FIG.7

| ENCODED IMAGE DATA | | PRESPECIFIED EDGE PATTERN | | INNER PRODUCT OUTPUT | |
|---|---|---|---|---|---|
| Vj1(MSB) | Vj0(LSB) | Wj1(MSB) | Wj0(LSB) | Uj1(MSB) | Uj0(LSB) |
| 0 | 0 | 0 | 0 | 0 | 0 |
| 0 | 0 | 0 | 1 | 0 | 0 |
| 0 | 0 | 1 | 0 | X | X |
| 0 | 0 | 1 | 1 | 0 | 0 |
| 0 | 1 | 0 | 0 | 0 | 0 |
| 0 | 1 | 0 | 1 | 0 | 1 |
| 0 | 1 | 1 | 0 | X | X |
| 0 | 1 | 1 | 1 | 1 | 1 |
| 1 | 0 | 0 | 0 | X | X |
| 1 | 0 | 0 | 1 | X | X |
| 1 | 0 | 1 | 0 | X | X |
| 1 | 0 | 1 | 1 | X | X |
| 1 | 1 | 0 | 0 | 0 | 0 |
| 1 | 1 | 0 | 1 | 1 | 1 |
| 1 | 1 | 1 | 0 | X | X |
| 1 | 1 | 1 | 1 | 0 | 1 |

| 0 | 0 | 0 | X |
|---|---|---|---|
| 0 | 0 | 1 | X |
| 0 | 1 | 0 | X |
| X | X | X | X |

$Uj1(MSB) = \overline{Vj1}Vj0Wj1 + Vj1\overline{Wj1}Wj0$

| 0 | 0 | 0 | X |
|---|---|---|---|
| 0 | 1 | 1 | X |
| 0 | 1 | 1 | X |
| X | X | X | X |

$Uj0(LSB) = Vj0Wj0$

EDGE DETECTION METHOD AND APPARATUS FOR AN IMAGE PROCESSING SYSTEM

BACKGROUND OF THE INVENTION

The present invention relates to an image processing system and more particularly to an edge detection method and apparatus of an image processing system using multistate linear threshold logic elements.

In a motion detection system, which is one of the most important application areas of the present invention, is preprocessing is recommended because it can improve the accuracy in detecting motion vectors by removing unwanted factors in the image such as noise. Preprocessing can also reduce the computational load by mapping a full resolution image, usually represented by 8 bits per pixel, to a different type image represented by less than 8 bits per pixel.

Several kinds of preprocessing have been proposed for the above mentioned purpose. For example, Band Extract Representative Point (BERP) Method which was used by Umori et. al in "Automatic Image stabilizing system by Full-Digital Signal Processing", on IEEE Transactions on Consumer Electronics Vol. 36, No.3 published in Aug., 1990, can be thought of as a kind of bandpass filtering method. Although BERP method can efficiently filter out both the extremely high spatial frequency components such as noise and the low frequency components such as the flat area in intensity, it still needs more than two bits per pixel to represent the BERP image. The detected edge information can be represented by one bit per pixel. Accordingly, the edge detection method can simplify the hardware. There are various approaches for edge detection such as: (i) the use of image spatial gradients, (ii) the use of the Laplacian, (iii) the use of differences of averages, (iv) matching or fitting to a prespecified pattern, and (v) the detection of the zero-crossings filtered by the Laplacian of the Gaussian (LOG) in the image. The two major drawbacks of the edge detectors enumerated in (i)-(iv) are that they perform well only with some images and that performance of edge detection is prominently degraded when noise is present. On the other hand, approach (v) reduces the noise effect through the convolution with a Gaussian-shaped kernel. This operation may also improve the connectivity of extracted image and it guarantees that the zero crossings of the second derivative are preserved. However, the LOG operator has the potential drawback that the mask size is not constant and it becomes very large with a large amount of noise.

SUMMARY OF THE INVENTION

Accordingly, it is an object of the present invention to provide an edge detection method which can reduce noise without increasing window size.

It is another object of the present invention to provide an edge detection apparatus which can simplify an implementation of hardware and do a real time operation.

To achieve the first object, an edge detection method of the present invention comprises the steps of;
converting the pixel data into a set of multi-state values;
performing an inner product of the set of multi-state values and a set of prespecified values; and making a decision according to the result of said inner product.

To achieve the second object, an edge detection apparatus of the present invention comprises:
a conversion means for converting the input pixel data into a set of multi-state values;
a matching means for performing an inner product of the set of multi-state values and a set of prespecified values; and
a decision means for making a decision according to the result of said inner product.

BRIEF DESCRIPTION OF THE DRAWINGS

FIG. 5 shows prespecified edge patterns used for the inner product of the present invention.

FIG. 7 is a truth table for the inner product output of W and V of the edge detection apparatus according to the present invention.

FIG. 8 is a Karnaugh's map for the simplification of the inner product circuit of the edge detection apparatus according to the present invention.

DETAILED DESCRIPTION OF THE INVENTION

Figure 1:
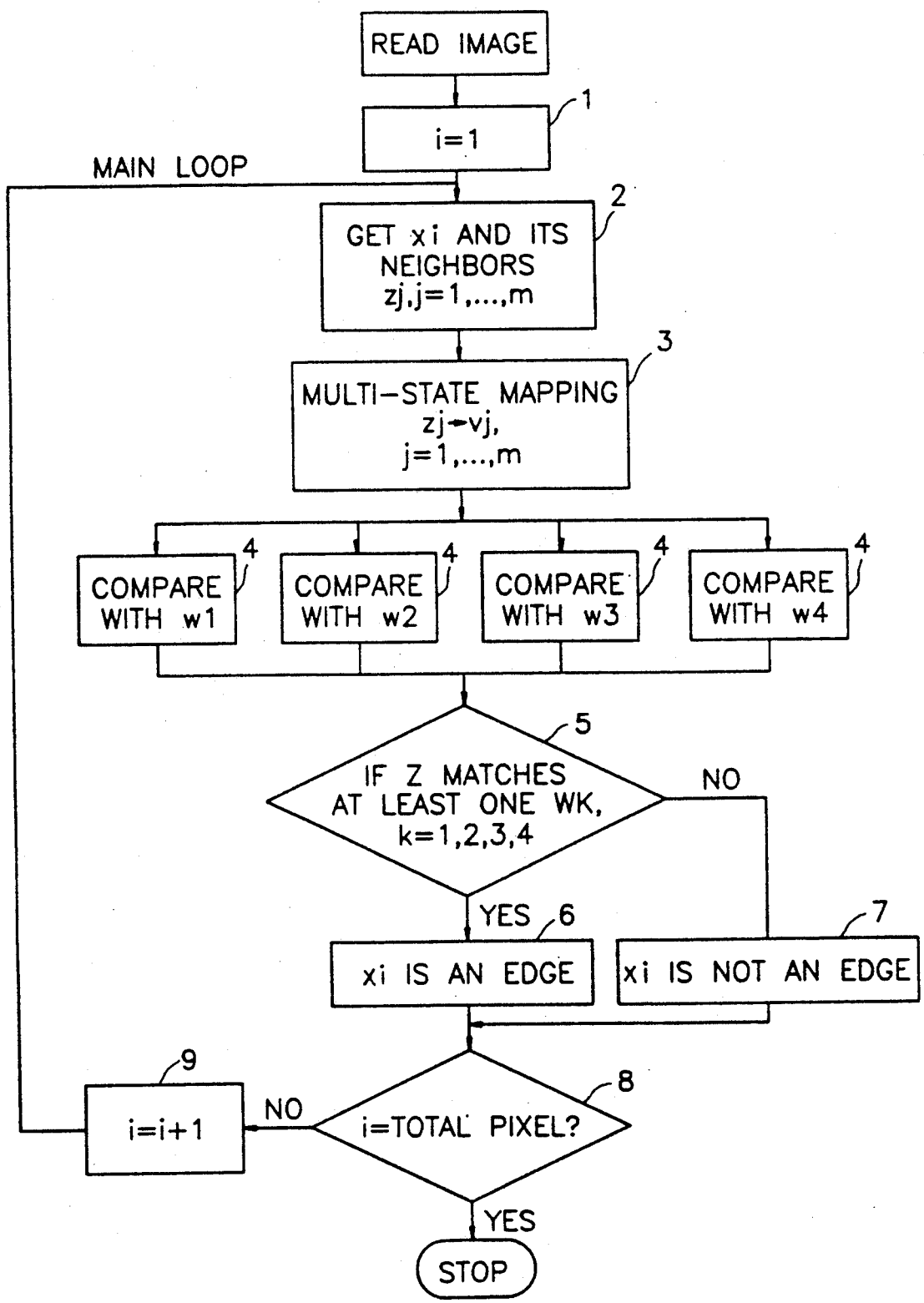
FIG. 1 is a flow chart which shows the signal flow of an edge detection apparatus of an image processing system according to the present invention.

The present invention is based on linear separability of multi-state linear threshold logic which can be explained by the following definition and theorem. Linear separability of binary input has been discussed in P. M. Lewis II and C. L. Coates, Threshold Logic, John Wiley and Sons, 1967. The definition of a linearly separable function of multi-state input is given here first.

Let P be a set of L-dimensional vectors. Each component of any vector in P takes on of $M=j+k+1$ values in $\{-j, \ldots, -1, 0, 1, \ldots, k\}$, that is, $$P = \{x | x_i \in \{-j, \ldots, -1, 0, 1, \ldots, k\}, i=1, \ldots, L\}$$

Then the maximum number of different vectors in P becomes $M^L$ and we call $-j$ and $k$ the extreme values of the input state. Let $P_0$ and $P_1$ be two mutually exclusive subsets of P such that $P_0 \cup P_1 = P$.

Given the weight vector w, a logical function F defined by $$F(X) = \begin{bmatrix} 1, & W^T X \geq \theta \\ 0, & W^T X < \theta \end{bmatrix}$$

where $\theta$ is a threshold value, is of the linearly separable class if and only if $$W^T X > W^T Y, \forall X \epsilon P_1,$$

and $$\forall Y \epsilon P_0.$$

The analysis of multi-state linear separability is in general a complicated task. However, a special class of logical functions, which will be use in the proposed edge detector, can be shown to be linearly separable, according to the following theorem.

Let x be an L-dimensional input vector whose components are all extreme values and let $P_1 = \{X\}$ and $P_0 = P - \{X\}$, i.e., $P_1 = \{X | X_i \epsilon \{-j, k\}, i=1, \ldots, L\}$ and $P_0 = P - P_1$, where P, $-j$, and k are given in the above definition. Then there exists a linearly separable function F which separates the input vector X from others.

The proof of the above theorem is as follows. We prove this theorem, by using the above definition and showing that there exists a weight vector W which satisfies $$W^T X > W^T Y, \forall X \epsilon P_1, \text{ and } \forall Y \epsilon P_0.$$

Let us consider the following weight vector $$W_i = \begin{bmatrix} 1, & X_i = k \\ -1, & X_i = -j, \end{bmatrix} \quad i = 1, \ldots, L.$$

Then the following inequality holds $$W_i X_i \geq W_{2i} Y_i, \forall i.$$

By summing these inequalities for $i=1, \ldots, L$, we have $$W_T X > W_T Y,$$

because for at least one i, the equality should not hold.

We can also consider a set $P_{-1} = \{-X\}$, where X and W are defined in the above equation respectively. Then we have a kind of multicategory discriminant function of multi-state inputs such as $$W^T(-X) < W^T Y < W^T X,$$

$$Y \epsilon P_0.$$

In order to use the multi-state linear threshold logic for edge detection, we have to map the continuous intensity value of a pixel to several discrete states.

Let us use an $1 \times 1$ local window for detecting an edge at a given pixel location. We assume that the image size is $n = n_1 \times n_2$. Let $X_i$, $i=1, \ldots, n$, be the i-th pixel value in the lexicographically ordered image and $Z_j$, $j=1, \ldots, r$, the j-the pixel value in the lexicographically ordered pixel values inside the local window centered by Xi, where $r = 1 \times 1$. Then for the local window corresponding to $X_i$, $Z_j$ can be obtained by the mapping $$Z_j = X_k, j = 1, \ldots, r$$

where $$K = i + \{\lfloor (j-1)/1 \rfloor - \lfloor \tfrac{1}{2} \rfloor\} n_2 + \{(j-1) \bmod 1 - \lfloor \tfrac{1}{2} \rfloor\}.$$

The notation $\lfloor \tfrac{i}{2} \rfloor$ denotes the integer part of the resulting division, and i mod 1 equals the value of the residual of the division of the integer i by the integer 1.

After the one dimensional array $Z_j$ is obtained, the local mean corresponding to the i-th pixel is equal to $$M_i = \frac{1}{r} \sum_{j=1}^{r} Z_j$$

Then the state for the j-th input to the multi-state linear threshold logic, $V_j$, is defined by $$V_j = \begin{bmatrix} -1 & Z_j < M_i - \epsilon \\ 0 & M_i - \epsilon \leq Z_j \leq M_i + \epsilon \\ 1 & Z_j > M_i + \epsilon \end{bmatrix}$$

where $\epsilon$ is the safeguard against noisy data. The larger the amount of noise to be suppressed, the larger $\epsilon$ should be.

We define four pairs of bidirectional edges whose directions are 0 and 180, 90 and 270, 45 and 225, and 135 and 315 degrees, respectively. First, a right edge is defined by ascending input states from right to left in the local window. For $1=3$, for example, the right edge and its bidirectional counterpart, the left edge, are respectively given by $$\begin{bmatrix} 1 & x & -1 \\ 1 & x & -1 \\ 1 & x & -1 \end{bmatrix} \text{ and } \begin{bmatrix} -1 & x & 1 \\ -1 & x & 1 \\ -1 & x & 1 \end{bmatrix},$$

where x represents the don't care state. The second pair of edges, the upper and the down edges are defined in the same way, that is $$\begin{bmatrix} -1 & -1 & -1 \\ x & x & x \\ 1 & 1 & 1 \end{bmatrix} \text{ and } \begin{bmatrix} 1 & 1 & 1 \\ x & x & x \\ -1 & -1 & -1 \end{bmatrix}.$$

The third pair of edges denoted by right-upper and left-down edges are given by $$\begin{bmatrix} x & -1 & -1 \\ 1 & x & -1 \\ 1 & 1 & x \end{bmatrix} \text{ and } \begin{bmatrix} x & 1 & 1 \\ -1 & x & 1 \\ -1 & -1 & x \end{bmatrix}.$$

Finally, the pair of edges denoted by left-upper and right-down edges are given by $$\begin{bmatrix} -1 & -1 & x \\ -1 & x & 1 \\ x & 1 & 1 \end{bmatrix} \text{ and } \begin{bmatrix} 1 & 1 & x \\ 1 & x & -1 \\ x & -1 & -1 \end{bmatrix}.$$

For l=5, the riHxt edge, for example, has 1 in the first column, −1 in the last column, and x (don't care) in the remaining columns.

Using the multicategory discriminant function given in the equation both the right and left edges can be detected by the same weight vector, denoted by $W_-$, because they are composed by extreme values and the left edge is equal to the right edge with the sign inverted. In the same manner, the upper and down edges, the right-upper and left-down edges, and the left-upper and right-down edges are detected by $W_|$, $W_/$, and $W_\backslash$, respectively. As shown by the above described therorem, one possible weight vector for detecting the right or the left edge, for example, for l=3, is equal to $$W_- = [1 \; x \; -1 \; 1 \; x \; -1 \; 1 \; x \; -1]^T.$$

Clearly, based on this equation, the rest of the weight vectors, that is, $W_|$, $W_/$, and $W_\backslash$, can be obtained by appropriately arranging the elements of $W_-$.

Alternatively, the LMS algorithm can also be used to obtain the weight vector.

Based on the definition of edges given in the previous section, the edge is detected by ORing the outputs of four multi-state linear threshold logic with properly trained weight vectors. The complete edge detection procedure is described by the following algorithm.
1. Choose the size of the local window l.
2. For i=1, ... ,n do
   2.1 Form Z
   2.2 Compute the input state V set $V_0 := 1$.
   2.3 Compute the four inner products, $W_-^T V$, $W_|^T V$, $W_/^T V$ and $W_\backslash^T V$. If at least one of them is greater than or equal to the output threshold $\theta$, or less than or equal to $-\theta$, in which case the output of the OR gate is equal to 1, an edge is detected at location i, otherwise, there is no edge.

In implementing the above algorithm, the nonlinear function g(·) given as following is used, $$g(u) = \begin{bmatrix} 1 & u \geq \theta \\ 0 & -\theta < u < \theta \\ -1 & u \leq -\theta \end{bmatrix}$$

where $\theta$ is a threshold value, $\theta$ was set equal to six when the above weight vector was used.

Regarding the choice of the mask size, the following issues should be taken into account. The larger mask size, better the noise control due to the local averaging operation in step (2.2) in the above algorithm. However, there are two drawbacks in increasing the mask size, that is, (i) it becomes more difficult to detect edges in directions different form 0, 45, 90, 135, 180, 225, 270, and 315 degrees and (ii) since more inputs are needed for the multi-state linear threshold logic, more interconnections and computation are required. The mask size of l=3 has been shown to be very effective based not only on window is the most sensitive one to edges in any direction, because it is the smallest symmetric window.

FIG. 1 is a flow chart showing a signal flow in the edge detection method according to the present invention. By using FIG. 1, software implementation can directly be realized. In the first step, index i represents the lexicographically ordered pixel position. In the second step, get neighbors, $Z_j$, j=1, ... ,m, of the local image pattern centered by an i-th pixel $X_i$. In the third step, $Z_j$ represents a set of pixels in a local window including the i-th pixel $X_i$ and m the number of pixels in the local window. Also, in the third step, $Z_j$'s, j=1, ... ,m, are mapped to corresponding multi-state values $V_j$, j=1, ... ,m. In the fourth step, $V = [V_1, ... , V_m]^T$ is compared with a prespecified edge patterns, $W_1$, $W_2$, $W_3$ and $W_4$, respectively. In the fifth step, if V matches at least one among the prespecified edge patterns $W_1$, $W_2$, $W_3$ and $W_4$, in sixth step, the i-th pixel $X_i$ is decided to be an edge. Otherwise, in the seventh step, the i-th pixel $X_i$ is decided not to be an edge. In the eighth step, if the i-th pixel $X_i$ is not total pixel, in the ninth step, i is increased by 1 and the process returns to the second step and performs a main loop repeatedly. Otherwise, in the eighth step, the operation stops.

Figure 2:
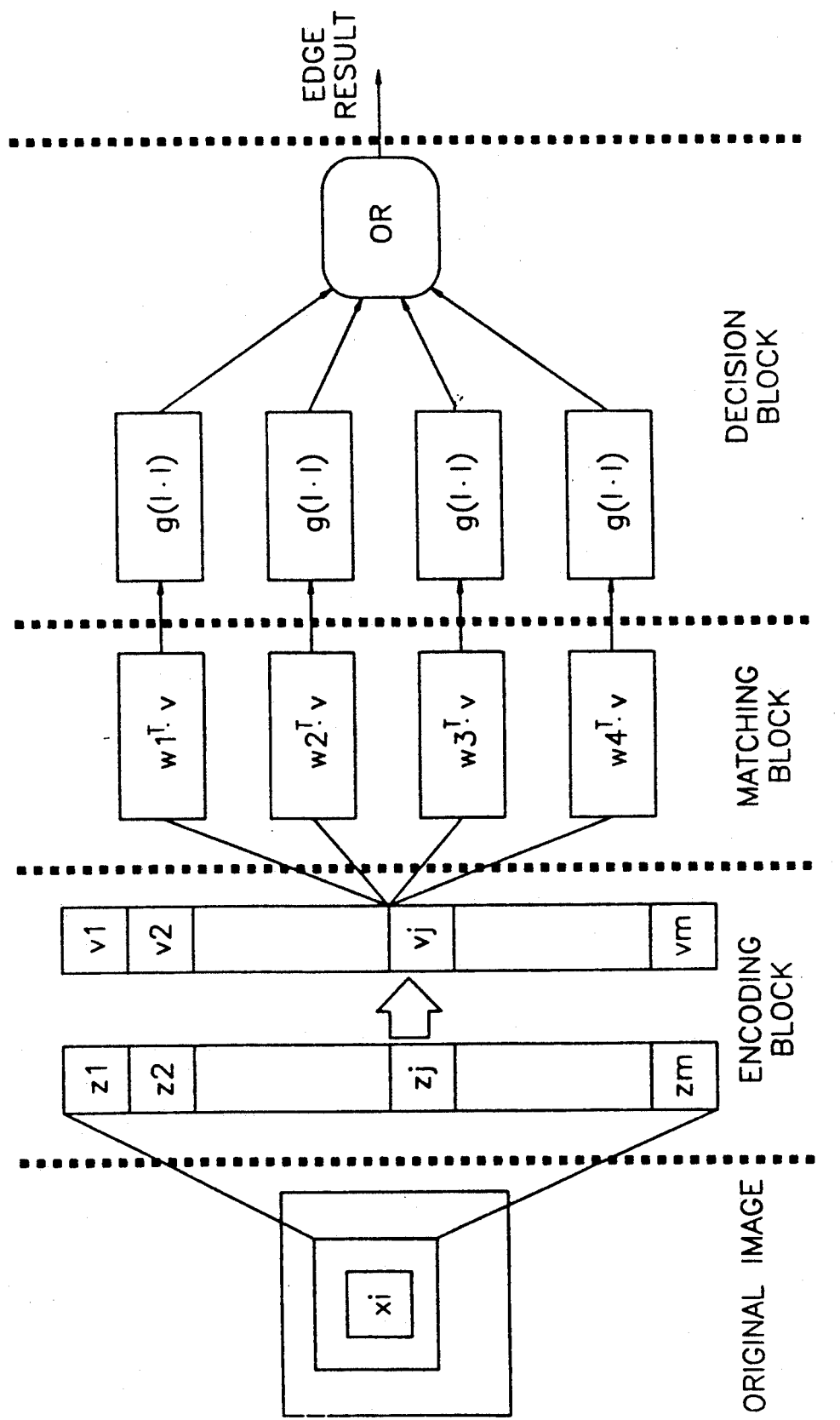
FIG. 2 is a block diagram showing the edge detection apparatus according to the present invention.

FIG. 2 shows a general block diagram of an edge detection apparatus according to the present invention. The construction and function of the apparatus are as follows.

FIG. 2 consists of three blocks, an encoding block for converting the lexicographical ordered data $Z_1, ... , Z_m$ into a multi-state $V_1, ... , V_m$ after an original image data $X_i$ is ordered lexicographically by using a local window, a matching block for performing an inner-product a multi-state data $V_1, ... , V_m$ and the prespecified edge patterns $W_1$, $W_2$, $W_3$ and $W_4$ corresponding to $W_-$, $W_|$, $W_/$ and $W_\backslash$, respectively, and a decision block for comparing the respective resulting data of the inner-product with an output threshold value and deciding whether the original image data $X_i$ is an edge or not.

The above three blocks perform functions as follows.

First, a concept of window is needed to decide whether the original image data $X_i$ is an edge or not by correlation of a neighboring pixels. Thus the encoding block arranges the neighboring pixels, $Z_1, Z_2, ... , Z_m$, one-dimensionally and gets a mean value having an intensity value and converts the neighboring pixels, $Z_1, Z_2, ... , Z_m$, into the corresponding multi-state values, $V_1, V_2, ... , V_m$.

If $V_j$, j=1, ... ,m, have M-states (M>2), $\log_2^M$ is required to represent $V_j$. The notation $\log_2^M$ denotes $\log_2^M$ if M is a multiple of 2, and otherwise, it denotes the integer part of $\log_2^M + 1$. Here, by inserting the mean value and a noise control parameter $\epsilon$, the matching block separates the respective pixels into three levels which have a value over mean+$\epsilon$, a value below mean−$\epsilon$, and a value between mean+$\epsilon$ and mean−$\epsilon$ respectively. Here, the noise reduction effect prominently appears according to the parameter $\epsilon$.

A matching block outputs the degree of matching of the converted image data and four prespecified edge patterns respectively. That is, the matching block performs the inner product of the converted image data, $V_1, V_2, ... , V_m$, and the respective four prespecified edge patterns, $W_1$, $W_2$, $W_3$, and $W_4$ which are expected with respect to a horizontal, vertical and two diagonal directions. Here, $W_1^T \cdot V$ represents the inner product of the converted image data, $V_1, V_2, ... , V_m$, and the prespecified edge patterns $W_1$ which is expected with respect to the horizontal direction.

A real time process can be realized, which is based on the image processing system by performing the operation of the four inner products simultaneously.

A decision block performs a function which compares an output value of the inner products, $W_1^T \cdot V, W_2^T \cdot V, W_3^T \cdot V, W_4^T \cdot V$, respectively with a given constant and decides to be an edge if at least one among the output values and the converted image data, $V_1, V_2, \ldots, V_m$, match. And the given constant for comparing with the output values of the inner products can be controlled by user by using a microcomputer.

Figure 3:
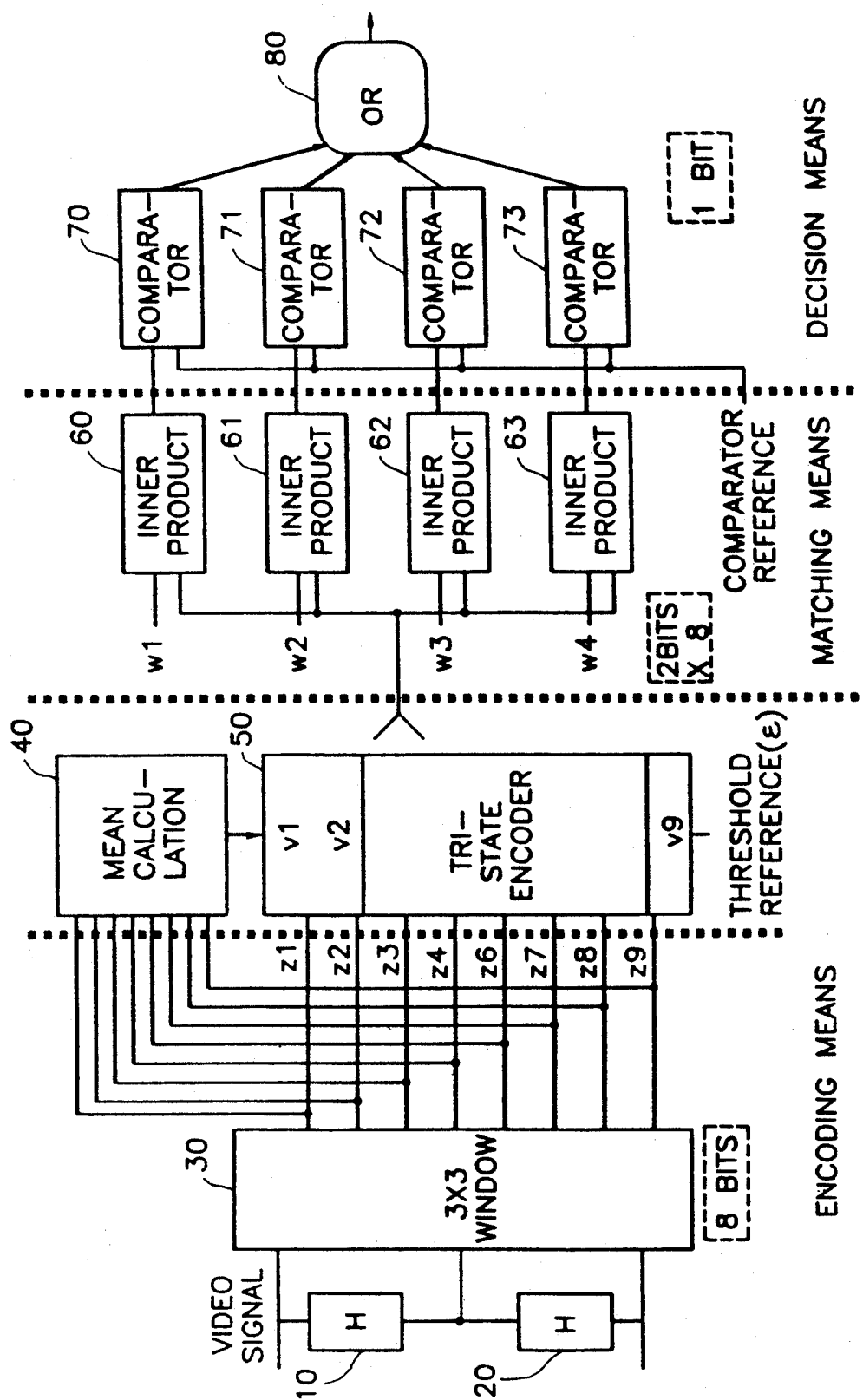
FIG. 3 is a block diagram showing a preferred embodiment of the edge detection apparatus according to the present invention.

FIG. 3 shows of the a preferred embodiment edge detection apparatus according to the present invention. The construction and the function of the apparatus are as follows.

An encoding means comprises a first delay device 10 for outputting one horizontal scanned line delayed signal, a second delay device 20 which is serially connected to the first delay device 10, for outputting two horizontal scanned line delayed signal, a 3×3 window circuit 30 for storing nine pixel data in the 3×3 local window circuit, a mean calculation circuit 40 for getting a mean value of an eight pixel data except the center pixel in 3×3 local window, and a tri-state encoder 50 for separating the respective eight pixel data from three levels by using the mean value and the given value and converting the eight pixel data into codes corresponding to three levels.

A matching means comprises the inner product circuits 60, 61, 62, 63 for performing inner product of the respective prespecified edge patterns, $W_1$, $W_2$, $W_3$ and $W_4$, and the outputs of the tri-state encoder 50.

A decision means comprises comparators 70, 71, 72, 73 for comparing the outputs of the respective inner product circuit 60, 61, 62, 63 with the given constant and outputting the matching signal, and OR gate for summing logically the outputs of the comparators 70, 71, 72, 73.

Figure 4:
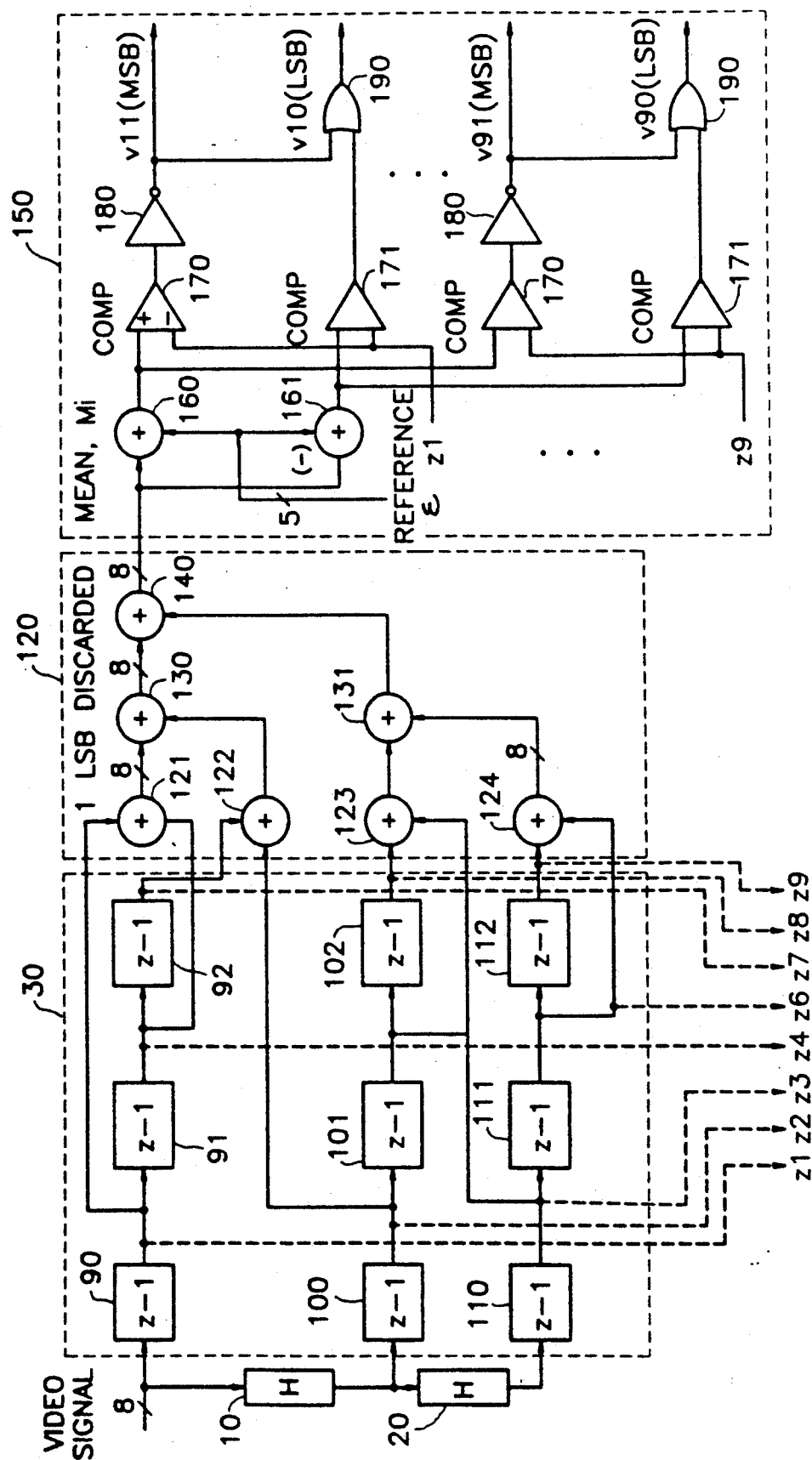
FIG. 4 is a block diagram showing the encoding circuit of the edge detection apparatus according to the present invention.
Figure 6A:
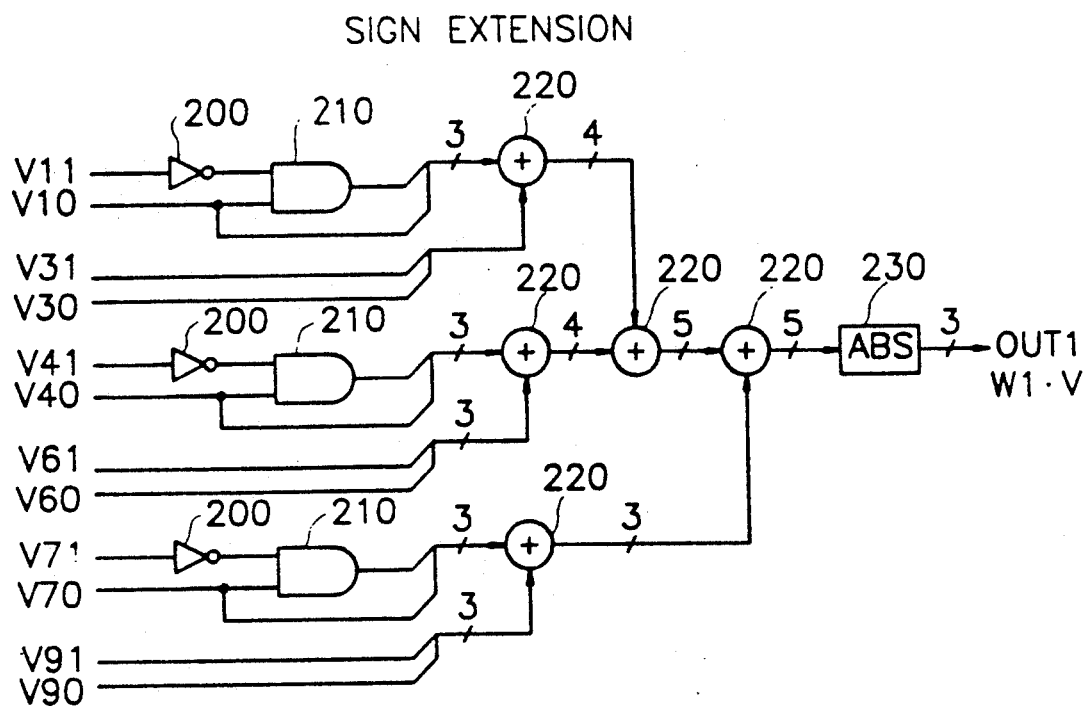
FIG. 6A is a block diagram for the inner-product $W_1 \cdot V$ of a matching means of the edge detection apparatus according to the present invention.
Figure 6B:
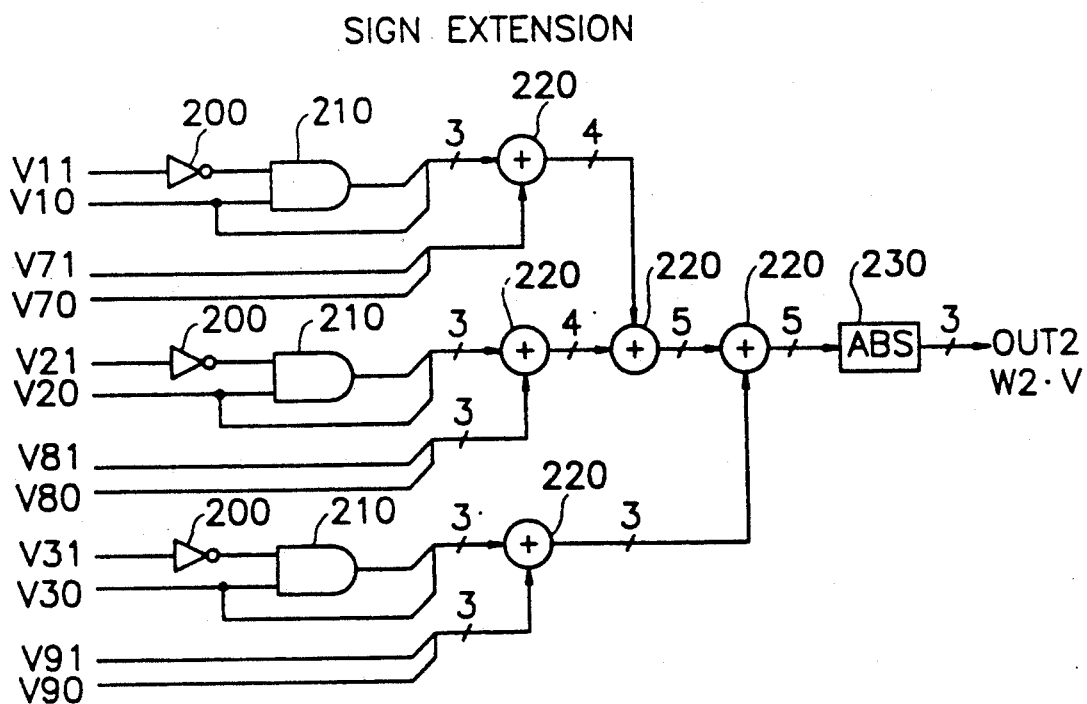
FIG. 6B is a block diagram for the inner product $W_2 \cdot V$ of the matching means of the edge detection apparatus according to the present invention.
Figure 6C:
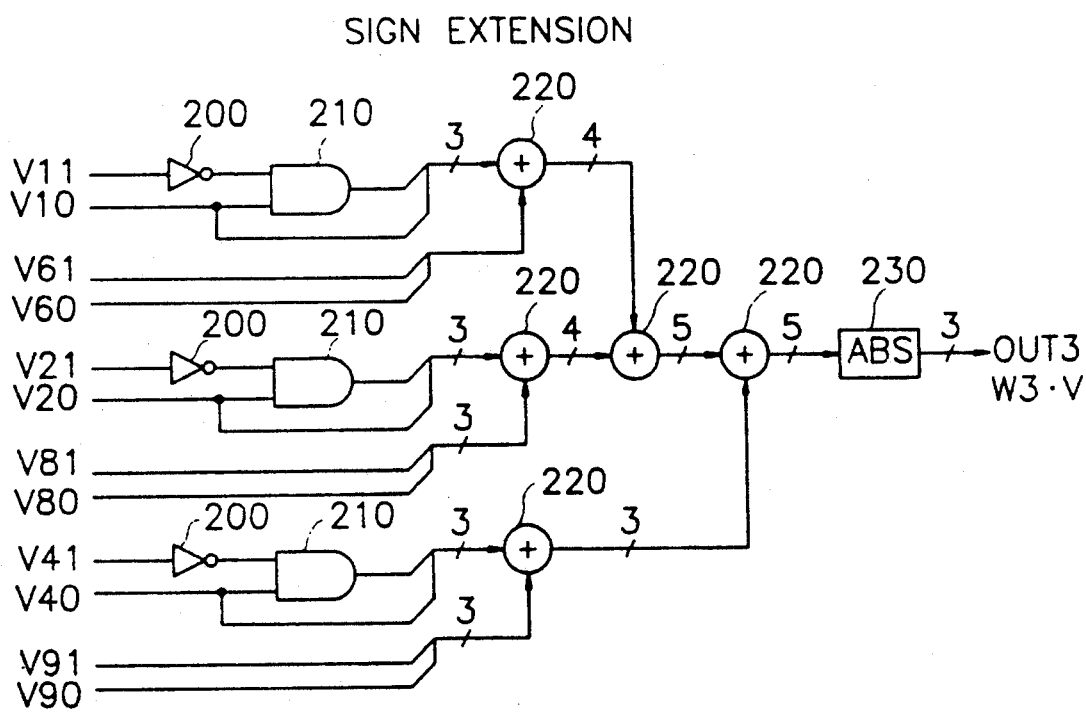
FIG. 6C is a block diagram for the inner product $W_3 \cdot V$ of the matching means of the edge detection apparatus according to the present invention.
Figure 6D:
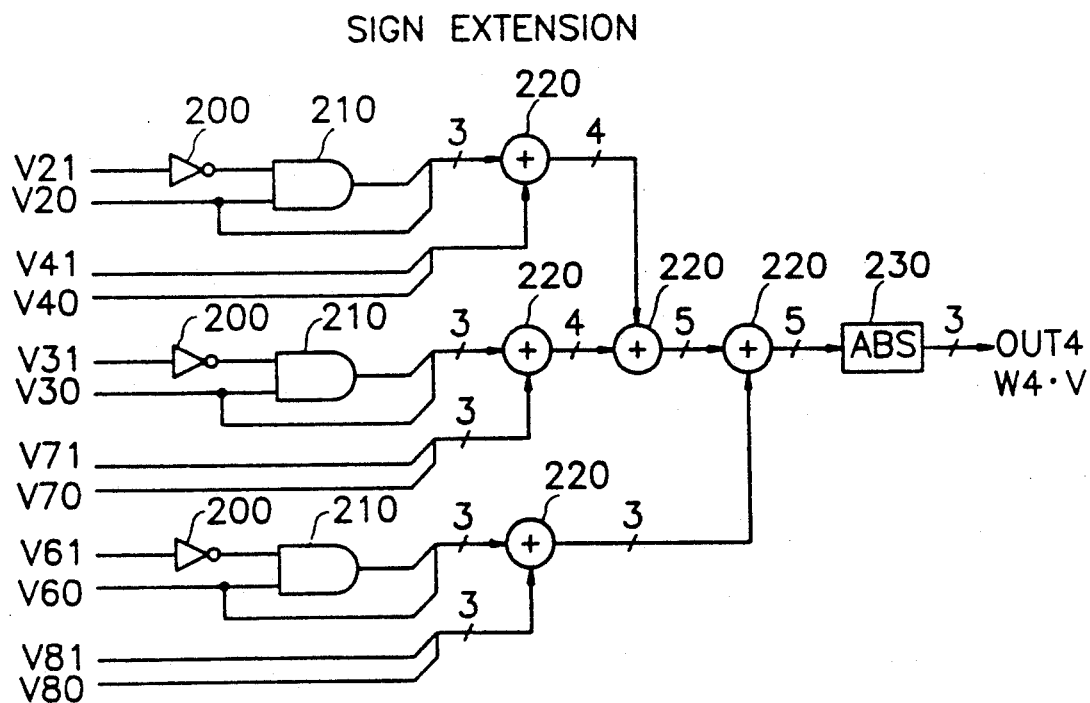
FIG. 6D is a block diagram for the inner product $W_4 \cdot V$ of the matching means of the edge detection apparatus according to the present invention.

FIG. 4 shows a preferred embodiment of the encoding means. The 3×3 window circuit 30 comprises three registers 90, 91, 92 respectively including a set of eight parallel connected D-type flip-flops and serially connected to an input terminal for inputting a sequentially scanned digital video signal represented by eight bits, and three registers 100, 101, 102 respectively including a set of eight parallel connected D-type flip-flops and serially connected to an output terminal of the first delay device 10, and three registers 110, 111, 112 respectively including a set of eight parallel connected D-type flip-flops and serially connected to the output terminal of the second delay device 20 for inputting the output signal of the second delay device 20. The 3×3 window circuit 120 comprises adders 121, 122, 123, 124 for adding by twos the output signals of the eight registers 90, 91, 92, 100, 102, 110, 111, 112, except the output signal of the one register 101, and adders 130, 131 for adding by twos the signals remaining after discarding the least significant bit LSB from output signals of the adders 121, 122, 123, 124, and an adder 140 for adding signals remaining after discarding on least significant bit LSB from output signals of the adders 130, 131 and for outputting a signal remaining after discarding one least significant bit LSB of its output signal.

The output signals of the eight registers 90, 91, 92, 100, 102, 110, 111, 112 and the output signal of the adder 140 are temporarily stored in registers (not shown) for inputting in the following stage. That is, the mean calculation circuit 120 calculates a means value as follows.

Let $Z_1, Z_2, Z_3, Z_4, Z_6, Z_7, Z_8$ and $Z_9$ be the outputs from the registers 90, 91, 92, 100, 102, 110, 111, 112 and A, B, C, D are represented by $$A = Z_1 + Z_2, \quad B = Z_3 + Z_4, \quad C = Z_6 + Z_7, \quad D = Z_8 + Z_9.$$

Here, let E, F, G, and H be the remaining after discarding one LSB bit of the values A, B, C, D.
Then, E, F, G, and H are represented by $$E = \frac{Z_1 + Z_2}{2}, \quad F = \frac{Z_3 + Z_4}{2},$$

$$G = \frac{Z_6 + Z_7}{2}, \quad H = \frac{Z_8 + Z_9}{2}$$

And, let I and J be the outputs of the addition of E and F, and G and H, respectively, such as, $$I = \frac{Z_1 + Z_2 + Z_3 + Z_4}{2}, \quad J = \frac{Z_6 + Z_7 + Z_8 + Z_9}{2}$$

Here, let k and L be the remaining values after discarding LSB from I and J, respectively, then K, L are represented by $$K = \frac{Z_1 + Z_2 + Z_3 + Z_4}{4}, \quad L = \frac{Z_6 + Z_7 + Z_8 + Z_9}{4}$$

And, suppose that the value resulted from adding K and L and discarding one LSB bit of the resultant value is M.

M is represented by $$M = \frac{Z_1 + Z_2 + Z_3 + Z_4 + Z_6 + Z_7 + Z_8 + Z_9}{8}$$

The obtained mean value M is not an exact one. But the difference between the exact mean value and the obtained mean value doesn't degrade the quality of a resulting edge because the obtained mean value is used for tri-state encoding of the following stage.

And, the tri-state encoder circuit 150 comprises the adder 160 for adding the mean value M and a parameter $\epsilon$ having a noise reduction effect and for producing a value $M + \epsilon$; the adder 161 for adding the mean value M and the parameter $-\epsilon$ and for producing a value $M - \epsilon$; a comparators 170 for comparing the respective pixel data, $Z_1, Z_2, \ldots, Z_9$ except the center pixel data, $Z_5$, with the value $M + \epsilon$; comparators 171 for comparing the respective pixel data, $Z_1, Z_2, \ldots, Z_9$ except the center pixel data, $Z_5$, with the value $M - \epsilon$; and inverters 180 for outputting a most significant bit MSB signals $V_{11}, V_{21}, \ldots, V_{91}$, of the comparators 170; and OR gates for outputting least significant bit LSB signals $V_{10}, V_{20}, \ldots, V_{90}$, of the tri-state signals and logically summing the outputs of the comparators 171. That is, the tri-state encoder 150 outputs a value 11 if the respective pixel data is smaller than the value $M - \epsilon$, and a value 01 if the respective pixel data are larger than the value $M + \epsilon$, and otherwise; a value 00. Here, suppose that the most significant bit MSB is a sign bit and the least significant bit LSB is a magnitude bit. Then, the values 11, 00, 01, correspond to the tri-state, $-1, 0, 1$, respectively.

FIG. 5 shows the four prespecified edge patterns, $W_1$, $W_2$, $W_3$ and $W_4$.

FIGS. 6A, 6B, 6C, 6D show the circuits for performing the inner products of the matching means of the present invention.

The matching means performs the inner products between two's complement of elements of the respective four prespecified edge patterns, $W_1$, $W_2$, $W_3$ and $W_4$, and the coverted values, $V_{11}V_{10}V_{21}V_{20}, \ldots, V_{91}V_{90}$.

FIG. 7 shows a truth table for the inner product.

FIG. 8 shows a Karnaugh's map for the simplification of the inner product circuit.

The simplified logic equations from FIG. 8 are $$V_{j1}(MSB) = \overline{V_{j1}}V_{j0}W_{ji} + V_{j1}\overline{W_{j1}}W_{j0}$$

$$V_{j0}(LSB) = V_{j0}W_{j0}.$$

These logic equation can be further simplified by using the properties of the four prespecified edge patterns.

First, in case that $W_{j1} = W_{j0} = 1$, $$U_{j1}(MSB) = \overline{V_{j1}}V_{j0},$$

$$U_{j0}(LSB) = V_{j0}.$$

Second, in case that $W_{j1} = W_{j0} = 0$, $$U_{j1}(MSB) = U_{j0}(LSB) = 0.$$

That is, the inner product output is always "0" regardless of the image data and then doesn't have influence on the resulting edge.

Third, in case that $W_{j1} = 0$, $W_{j0} = 1$, $$W_{j1}(MSB) = V_{j1},$$

$$U_{j0}(LSB) = V_{j0}.$$

As a result, in implementing a hardware, the four prespecified edge patterns exist implicitly, and only tristate values look like having an influence on the output of the inner product. Also, the obtained inner product outputs are represented by two bits and only six pixels out of nine pixels are used for each matching with a corresponding prespecified edge patterns.

A hardware implementation using the above logic equations is as follows.

First, the matching circuit of $W_1 \cdot V$ outputs $(\overline{V_{11}} \cdot V_{10})V_{10}$, $(\overline{V_{31}})V_{30}$, $(\overline{V_{41}} \cdot V_{40})V_{40}$, $V_{61}V_{60}$, $(\overline{V_{71}} \cdot V_{70})V_{70}$, $V_{91}V_{90}$.

Second, the matching circuit of $W_2 \cdot V$ outputs $(\overline{V_{11}} \cdot V_{10})V_{10}$, $V_{71}V_{70}$, $(\overline{V_{21}} \cdot V_{20})V_{20}$, $V_{81}V_{80}$, $(\overline{V_{31}} \cdot V_{30})V_{30}$, $V_{91}V_{90}$.

Third, the matching circuit of $W_3 \cdot V$ outputs $(\overline{V_{11}} \cdot V_{10})V_{10}$, $V_{61}V_{60}$, $(\overline{V_{21}} \cdot V_{20})V_{20}$, $V_{81}V_{80}$, $(\overline{V_{41}} \cdot V_{40})V_{40}$, $V_{91}V_{90}$.

Fourth, the matching circuit of $W_4 \cdot V$ outputs $(\overline{V_{21}} \cdot V_{20})V_{20}$, $V_{41}V_{40}$, $(\overline{V_{31}} \cdot V_{30})V_{30}$, $V_{71}V_{70}$, $(\overline{V_{61}} \cdot V_{60})V_{60}$, $V_{81}V_{80}$.

These logic equations are implemented by using an inverters 200 and a AND gates 210 as shown in FIGS. 6A, 6B, 6C and 6D.

Next, the outputs of the AND gates 210 and the outputs of the inverters 200 in the corresponding matching circuits are added for inner product.

Here, the addition is implemented by using adders 220 because the outputs of the AND gates 210 are represented by two's complement, and by adding an absolute circuit 230 to obtain the same edge result in case that the final value of the addition has a negative value. Also, the addition of the outputs of the AND gates 210 and the outputs of the inverters 200 use sign extension method.

Figure 9:
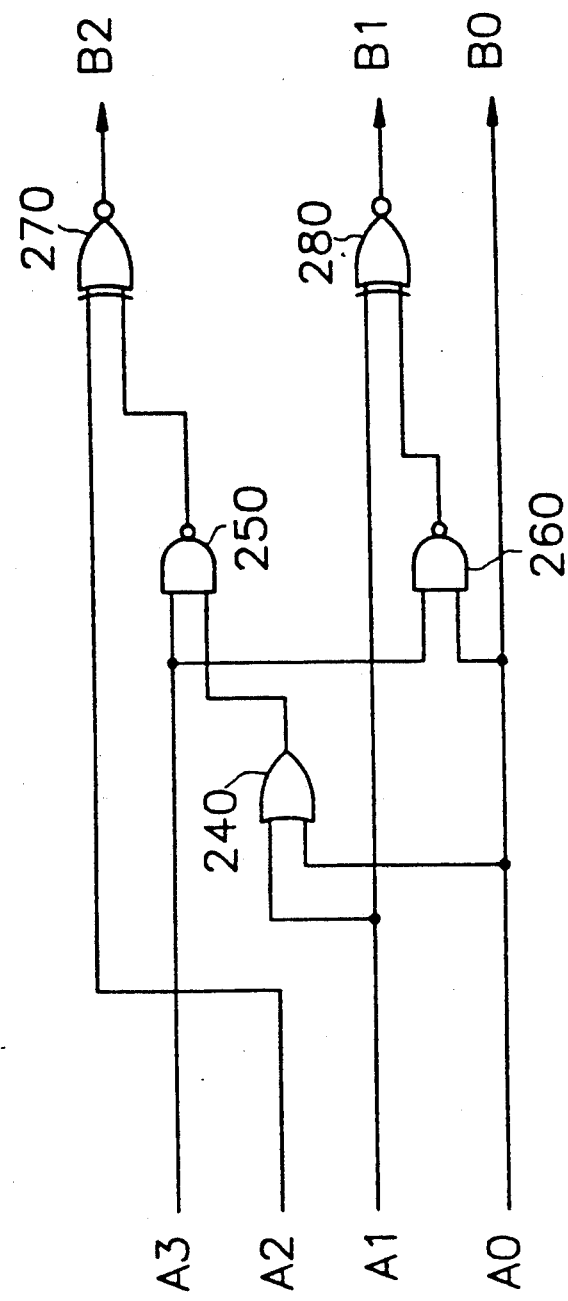
FIG. 9 shows a logic circuit diagram of the absolute value circuit of the matching means of the edge detection apparatus according to the present invention.

The absolute circuit 230 shown in FIGS. 6A, 6B, 6C and 6D for obtaining the absolute value is shown in FIG. 9 in more detail.

In FIG. 9, suppose that an input data are $A_3A_2A_1A_0$ and an output data is $B_2B_1B_0$. The absolute circuit 230 consists of OR gate 240 for ORing the input data $A_1$ and $A_0$, and NAND gate 250 for providing "0" when the output of the OR gate 240 and the input data $A_3$ are all "1", NAND gate 260 for providing "0" when the input data $A_3$ and $A_0$ are all "1", and EXNOR gate 270 for outputting "1" when the input data $A_2$ and the output of the NAND gate 250 are not the same values, and EXNOR gate 280 for outputting "1" when the input data $A_1$ and the output of the NAND gate 260 are not the same values. And the output values of the EXNOR gates 270, 280 and an input data, respectively, become the output $B_2B_1B_0$ of the absolute circuit 230.

Figure 10:
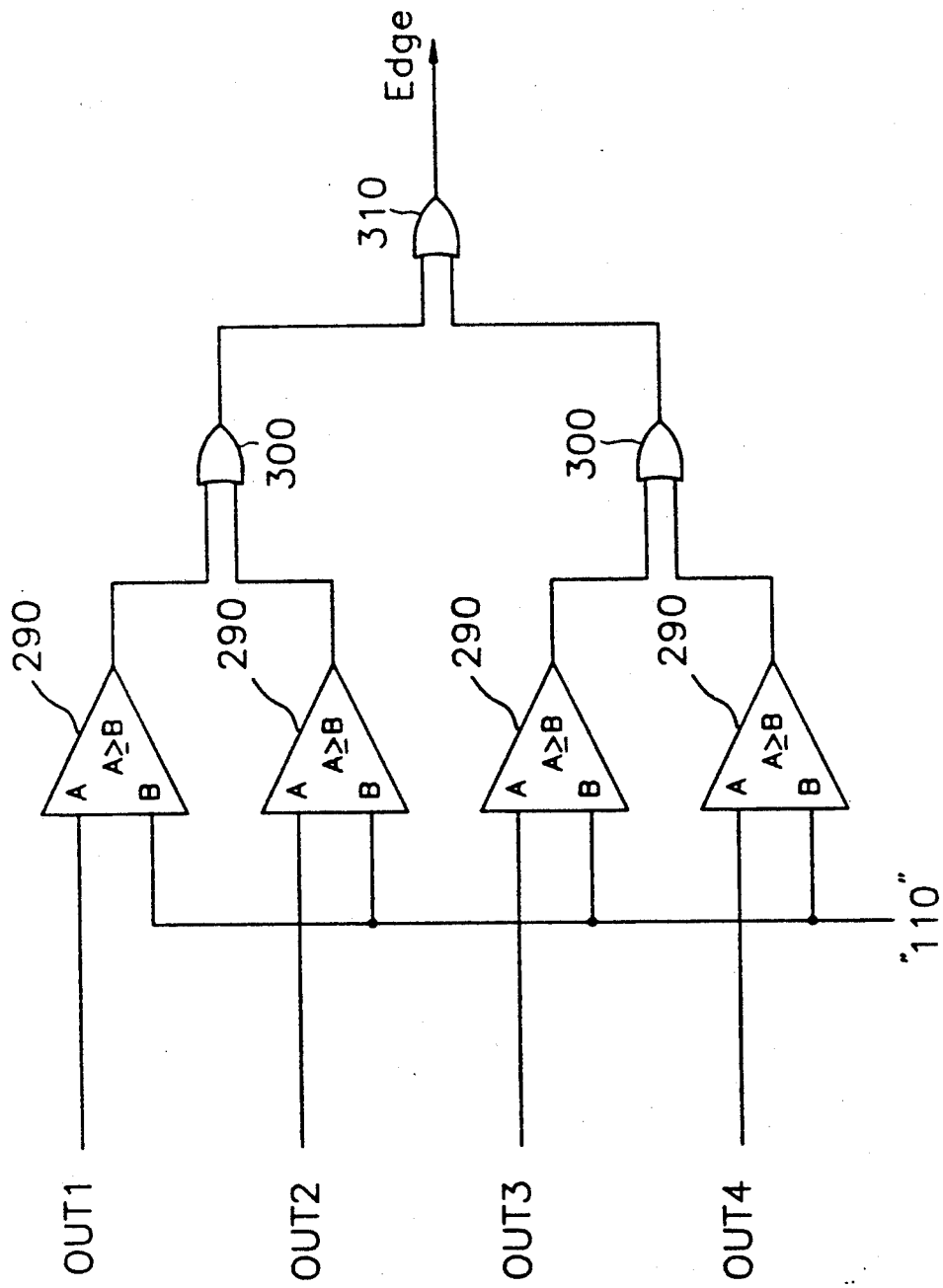
FIG. 10 shows a logic circuit diagram of the decision circuit of the edge detection apparatus according to the present invention.

FIG. 10 shows a preferred embodiment of the decision means of the edge detection apparatus of the invention. The decision means consists of four comparators 190 input signals, OUT1, OUT2, OUT3, and OUT4 from the matching means and a threshold value "110" of an edge, and two OR gates 300 for ORing the first two output signals of the four comparators 290, and OR gates 300 for ORing the other two output signal of the two OR gates 300. And, if at least one among the output signals, OUT1, OUT2, OUT3 and OUT4 is larger than or equal to "6", the output of the OR gate 310 becomes "1", that is, an edge.

Figure 11:
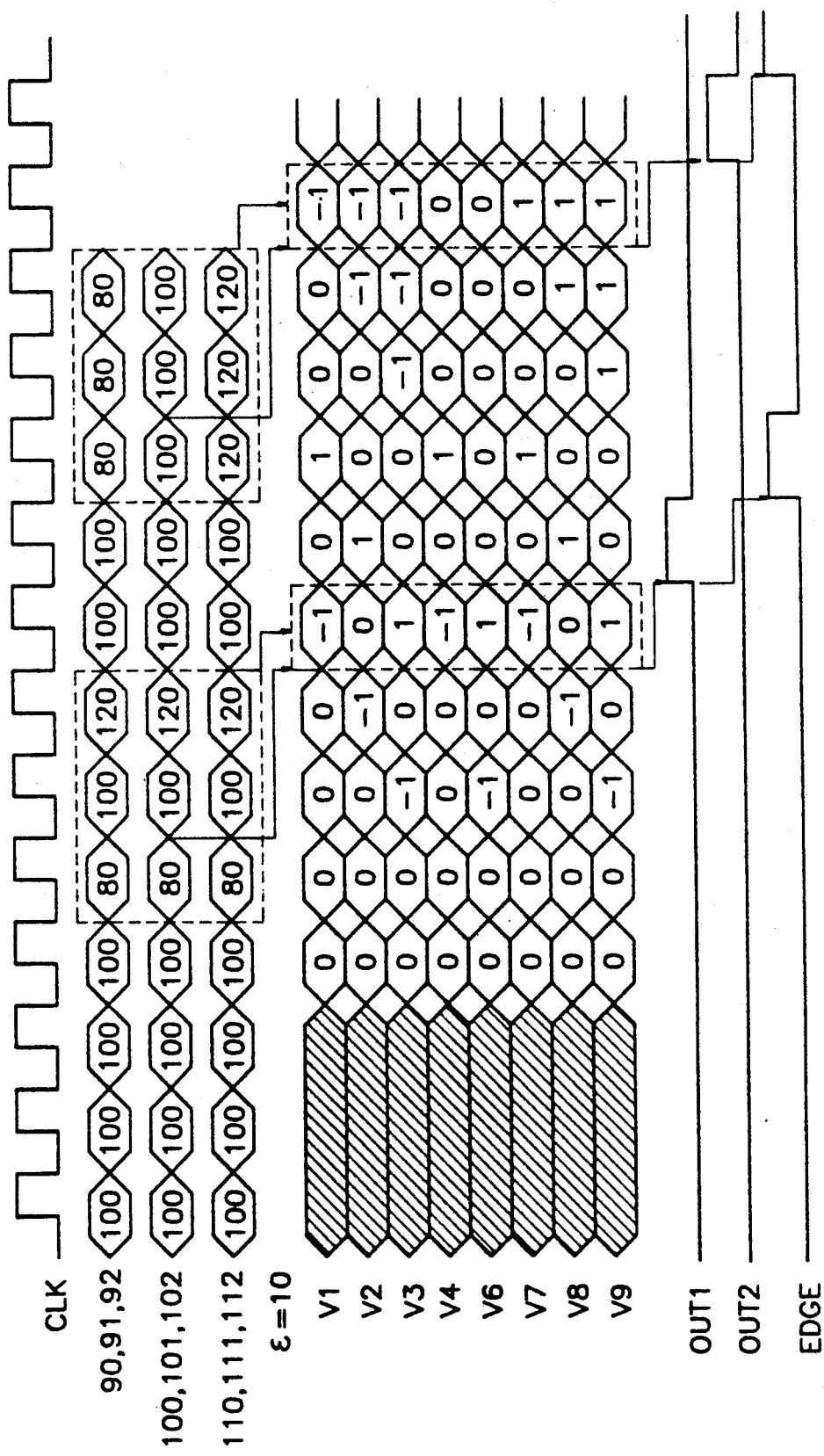
FIG. 11 is a timing diagram for explaining the operation of the edge detection apparatus according to the present invention.

FIG. 11 shows a timing diagram of the operation of the edge detection circuit.

Suppose that the input image data 90, 91, 92, 100, 101, 102, 110, 111, and 112 shown in FIG. 11 are stored in the 3×3 window circuit 30. Here, $\epsilon$ is set equal to 10. And the tri-state values, $V_1, V_2, V_3, V_4, V_6, V_7, V_8, V_9$, are shown in FIG. 11. Here, the input patterns in the two dotted square areas are equal to the corresponding prespecified edge pattern. That is, the first dotted square area is equal to $W_1$ and the second dotted square area is equal to $W_2$. Accordingly, the output signal EDGE becomes "1" when at least one of the output signals, OUT1 and OUT2 is "1".

The edge detection apparatus according to the present invention has the following advantages.

First, by using the present multi-state encoding method, it can greatly reduce noise effect without using additional lowpass filters.

Second, it can greatly reduce noise effect with 3×3 neighboring pixels, which is the smallest number of pixels for a two dimensional symmetric local window.

Third, by using several linear threshold logics at the same time it can utilize the rotation invariant properties of multi-layered linear threshold logics.

What is claimed is:

1. An edge detection method comprising:
   a converting step comprising steps for obtaining a mean value $M_i$ of pixel data Z; in an n×n window and converting said pixel data in said n×n window into tri-state values $V_j$ using said mean value $M_i$ and a predetermined threshold value $\epsilon$ $$V_j = \begin{bmatrix} -1 & Z_j < M_i - e \\ 0 & M_i - e < Z_j < M_i + e \\ 1 & Z_j > M_i + e \end{bmatrix}$$

for $j = 1, 2, \ldots, r$;

a comparing step for comparing $V_j$, which is said pixel data represented in tri-state values, with four pre-specified edge patterns $W_1$, $W_2$, $W_3$ and $W_4$, where $$W_1 = [-1\ 0\ 1\ -1\ 0\ 1\ -1\ 0\ 1]^T$$
$$W_2 = [-1\ -1\ -1\ 0\ 0\ 0\ 1\ 1\ 1]^T$$
$$W_3 = [-1\ -1\ 0\ -1\ 0\ 1\ 0\ 1\ 1]^T$$
$$W_4 = [0\ -1\ -1\ 1\ 0\ -1\ 1\ 1\ 0]^T$$

where the superscript T represents the transpose of the matrix; and decision steps for determining said pixel data to be an edge if $V_j$ is equal to any one of said four pre-specified edge patterns, and otherwise not to be an edge.

2. An edge detection apparatus comprising:

conversion means comprising: a mean value calculation circuit for obtaining a mean value of pixel data in a 3×3 window centered by an input pixel of interest and a conversion circuit for B×B converting said pixel data into tri-state values using said mean value and a predetermined threshold value;

matching means for obtaining inner products of said tri-state values and pre-specified edge patterns; and decision means for determining said pixel of interest to be an edge when said tri-state values are equal to any one of said edge patterns, and otherwise not to be an edge.

3. An edge detection apparatus claimed in claim 2, wherein said mean value calculating circuit comprises:

a first four-adder group for summing in pairs a first & second, third & fourth, sixth & seventh and eighth & ninth pixel data while excluding center pixel data;

a second two-adder group for summing in pairs the outputs remaining after discarding a least significant bit from said first adder group; and a third adder for summing the outputs remaining after discarding a least significant bit from said second adder group and outputting the signal remaining after discarding the least significant bit.

4. An edge detection apparatus as claimed in claim 3, wherein said decision means comprises:

a set of four comparators for respectively inputting the output of four absolute circuits and a given threshold value;

two OR gates for ORing in pairs the outputs of said set of four comparators; and an OR gate for ORing the outputs of said two OR gates.

5. An edge detection apparatus as claimed in claim 3 wherein said conversion means comprises:

a fourth adder for summing the output of said third adder and said predetermined threshold value;

a fifth adder for summing the output of said third adder and a negative value of said predetermined threshold value;

a first set of eight comparators for comparing the eight pixel data while excluding said center pixel data, with the output of said fourth adder;

a second set of eight comparators for comparing said eight pixel data with the output of said fifth adder;

eight inverters for inverting the respective outputs of said first set of eight comparators and outputting the most significant bit of said tri-state values; and eight OR gates for respectively ORing the outputs of said eight inverters with those of said second set of eight comparators, and outputting the least significant bit of said tri-state values.

6. An edge detection apparatus as claimed in claim 2, wherein said matching means comprises:

a first inner-product circuit for obtaining the inner product of said tri-state values and a first pre-specified edge pattern;

a second inner-product circuit for obtaining the inner product of said tri-state values and a second pre-specified edge;

a third inner-product circuit for obtaining the inner product of said tri-state values and a third pre-specified edge pattern; and a fourth inner-product circuit for obtaining the inner product of said tri-state values and a fourth pre-specified edge pattern.

7. An edge detection apparatus as claimed in claim 6, wherein said inner product of said tri-state values and said first pattern comprises:

three inverters for respectively inverting the most significant bit of the first, fourth and seventh values of said tri-state values;

three AND gates for respectively producing the logical products of the outputs of said three inverters and the least significant bits of said first, fourth and seventh values of said tri-state values;

a sixth five-adder group for summing the third, sixth and ninth values of said tri-state values and the outputs of said three AND gates by the use of sign extension; and an absolute circuit for obtaining the absolute value when the final output of said sixth adder group is negative.

8. An edge detection apparatus as claimed in claim 6, wherein said inner-product circuit of said tri-state values and said second pattern comprises:

three inverters for respectively inverting the most significant bit of the first, second and fourth values of said tri-state values;

three AND gates for respectively producing the logical products of the outputs of said three inverters and the least significant bit of said first, second and third values of said tri-state values;

a seventh five-adder group for summing the seventh, eighth and ninth values of said tri-state values and outputs of said three AND gates by the use of sign extension; and an absolute circuit for obtaining the absolute value when the final output of said seventh adder group is negative.

9. An edge detection apparatus as claimed in claim 6, wherein said inner product of said tri-state values and said third pattern comprises:

three inverters for respectively inverting the most significant bit of the first, second and fourth values of said tri-state values;

three AND gates for respectively producing the logical products of the outputs of said three inverters and the least significant bit of said first, second and fourth values of said tri-state values;

an eighth five-adder group for summing the sixth, eighth and ninth values of said tri-state values and the outputs of said three AND gates by the use of sign extension; and an absolute circuit for obtaining the absolute value when the final output of said eighth adder group is negative.

10. An edge detection apparatus as claimed in claim 6, wherein said inner product of said tri-state values and said fourth pattern comprises:

three inverters for respectively inverting the most significant bit of second, third and sixth values of said tri-state values;

three AND gates for respectively producing the logical products of the outputs of said three inverters and the least significant bit of said second, third and sixth values of said tri-state values;

a ninth five-adder group for summing the fourth, seventh and eighth values of said tri-state values and the outputs of said three AND gates by the use of sign extension; and an absolute circuit for obtaining the absolute value when the final output of said ninth adder group is negative.

11. An edge detection apparatus as claimed in any one of claims 7 or 8 or 9 or 10, wherein said absolute circuit comprises:

an OR gate for ORing the two least significant bits of four input bits;

a first NAND gate for inputting the output of said OR gate and the most significant bit of said four input bits;

a second NAND gate for inputting the most significant bit and the least significant bit of said four input four bits;

a first XNOR gate for inputting the output from said first NAND gate and the second most significant bit of said four input bits; and a second XNOR gate for inputting the output of said second NAND gate and the second least significant bit of said four input bits, wherein the output of said first XNOR gate, the output of said second XNOR gate, and the least significant bit of said input data correspond to the most significant bit of said absolute value, the middle significant bit of said absolute value, and the least significant bit of said absolute value, respectively.

* * * * *